Dec. 22, 1953   J. T. W. MOSELEY   2,663,543
WEED PULLER
Filed Nov. 5, 1951
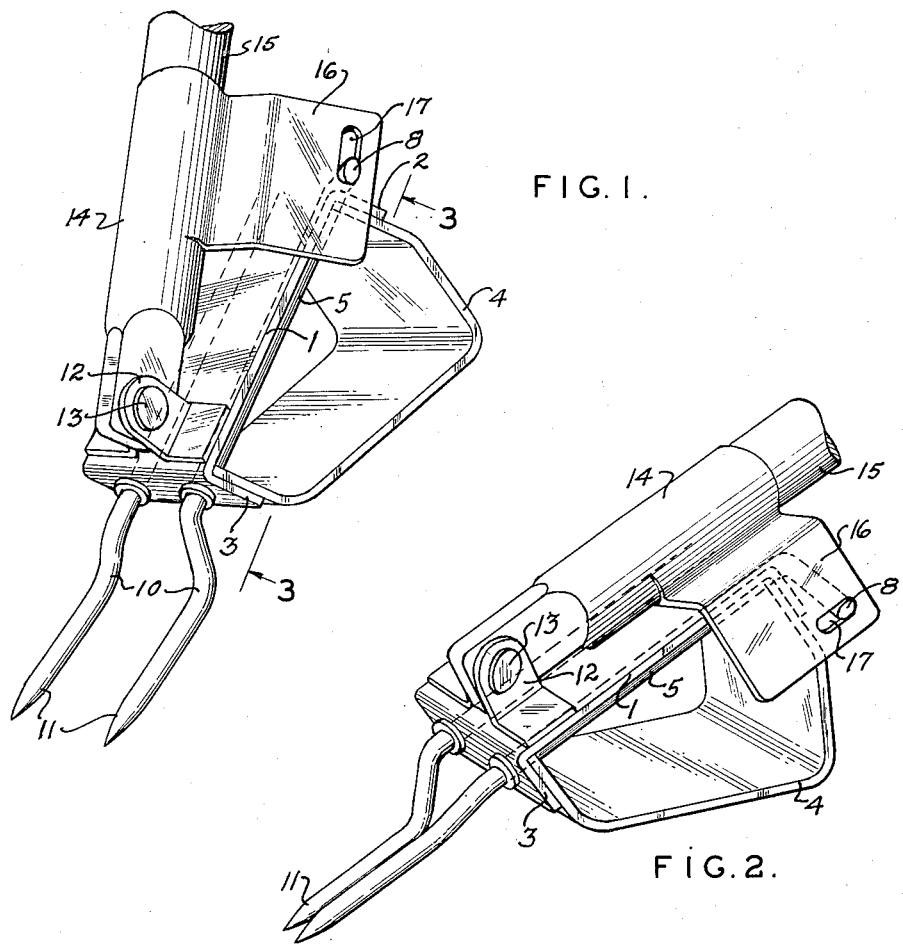
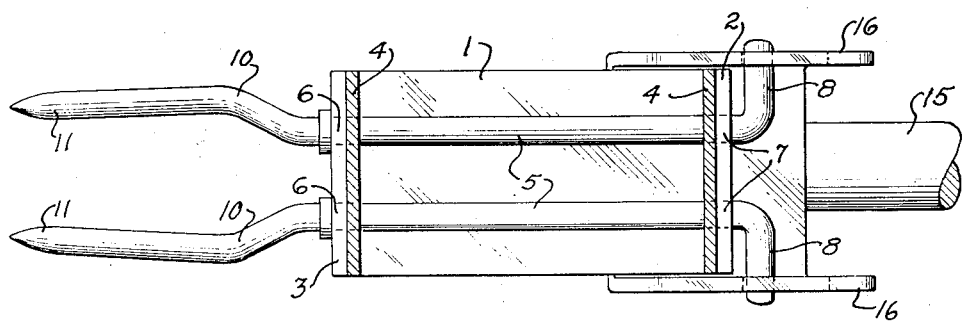
INVENTOR.
JAMES T. W. MOSELEY
BY
ATTORNEY Patented Dec. 22, 1953

2,663,543

UNITED STATES PATENT OFFICE 2,663,543

WEED PULLER

James T. W. Moseley, Richmond Heights, Mo.

Application November 5, 1951, Serial No. 254,953

5 Claims. (Cl. 254—132)

This invention relates to weed pullers and has for its object the provision of a new and improved hand tool with which the operator can uproot and pull weeds with a minimum of motion and effort. The device will be better understood upon reference to the accompanying drawing in which:

Fig. 1 is a perspective view of a weed puller, a part of the handle being omitted.

Fig. 2 is another perspective view of a weed puller corresponding to Fig. 1 except that the parts are in a different operating position.

Fig. 3 is a sectional plan view of the device shown in Figs. 1 and 2.

The reference numeral 1 indicates a main body member having flanges 2 and 3, respectively, which are turned down at right angles for attachment to a fulcrum plate 4. A pair of weed pulling tongs or elements 5 are journalled for partial rotation in bearings 6 and 7 formed in the flanges 2 and 3 of the main body member. The weed pulling members are bent outwardly as indicated at 8 to form an operating lever by means of which partial rotation of the members 5 and the opposite ends of the said members are bent out of line as indicated at 10 in Fig. 3, so that the spiked portions 11 can be moved toward and away from each other by partial rotation of the members 5. The main body member 1 is provided with upstanding flanges 12 carrying a pivot 13 to which is attached a socket member 14 having an opening to receive an operating handle 15. The socket 14 is provided with a pair of outwardly and downwardly turned arms 16 which are slotted as at 17 to receive the outwardly bent ends 8 of the weed pulling members.

In operation, when the device is lifted by the handle 15, the operating mechanism drops to the position shown in Fig. 1, causing the spiked portions 11 to be separated by the camming action of the slotted member 16 on the outwardly turned ends 8 of the members 5. With the parts in this position, the operator may plunge the spike members 11 into the ground on opposite sides of a weed which is to be pulled. When this is done, the continued downward movement of the arm causes the plate member 4 to be pressed against the ground, and the handle 14 presses the slotted member 16 down so as to rotate the members 5, thereby causing the spike members 11 to be forcibly urged toward each other. Since the dirt is yielding and frangible, the movement of the members 11 into contact with each other is resisted by the weed which it is desired to pull, resulting in the weed being gripped by the spikes 11, and further downward pressure on the handle 15 causes the plate 4 to be pressed against the ground and to act as a fulcrum to cause the tongs 11 to be forced together to grip the weed and then to be lifted out of the ground, carrying the weed with them. When the handle 15 is again lifted, the parts drop back by gravity into the position shown in Fig. 1, releasing the weed. It will be understood that the invention can be embodied in various ways, and accordingly I do not wish to be limited in my protection except in accordance with the following claims.

I claim:

1. In a weed puller, a frame carrying a pair of spikes rotatably mounted on the frame and having lever portions constructed and arranged to move the spike portions toward and away from each other, an operating handle connected to said frame and having a camming portion in operative engagement with said lever portions, said frame including a pressure plate constructed and arranged to act as a fulcrum between said handle and said spike members.

2. A weed pulling device comprising a frame having a pair of rotatable tongs pivoted thereto, said tongs comprising a pair of shafts each having spiked offset portions which may be moved toward and away from each other by rotation of the shafts in the frame, a handle pivotally connected to said frame, and camming means secured to the handle and operatively engaging said tongs for rotating said spike portions.

3. A weed pulling device comprising a frame having a pair of rotatable tongs pivoted thereto, said tongs comprising a pair of shafts each having spiked offset portions which may be moved toward and away from each other by rotation of the shafts in the frame, a handle pivotally connected to said frame, and camming means secured to the handle and operatively engaging said tongs for rotating said shafts in the frame, said frame having a ground contacting member constructed and arranged to act as a fulcrum between said handle and said spiked portions.

4. A weed pulling tool comprising a pair of relatively movable tongs, each of said tongs comprising a rotatably mounted shaft element, operating elements projecting therefrom, weed gripping elements eccentrically mounted with respect to the axis of said tong elements, and a handle having camming means operatively engaging said operating elements to rotate said shaft elements thereby to bring the weed gripping portions of the tongs together.

5. A weed pulling device comprising a fulcrum plate, a pair of parallel shafts rotatably mounted on said fulcrum plate, weed gripping eccentric portions mounted on said shafts, a handle movably mounted with respect to said fulcrum plate, and camming means secured to said handle and operated by movement of the handle to shift said eccentric portions.

JAMES T. W. MOSELEY.

References Cited in the file of this patent

UNITED STATES PATENTS

| Number | Name | Date |
| --- | --- | --- |
| 1,502,246 | Hagopian | July 22, 1924 |
| 1,795,441 | Rasmussen | Mar. 10, 1931 |
| 2,041,263 | Nirdlinger | May 19, 1936 |